July 10, 1956
C. N. BEBINGER
2,753,985
FLEXIBLE SHAKER CONVEYOR APPARATUS
Filed Dec. 21, 1950
2 Sheets-Sheet 1
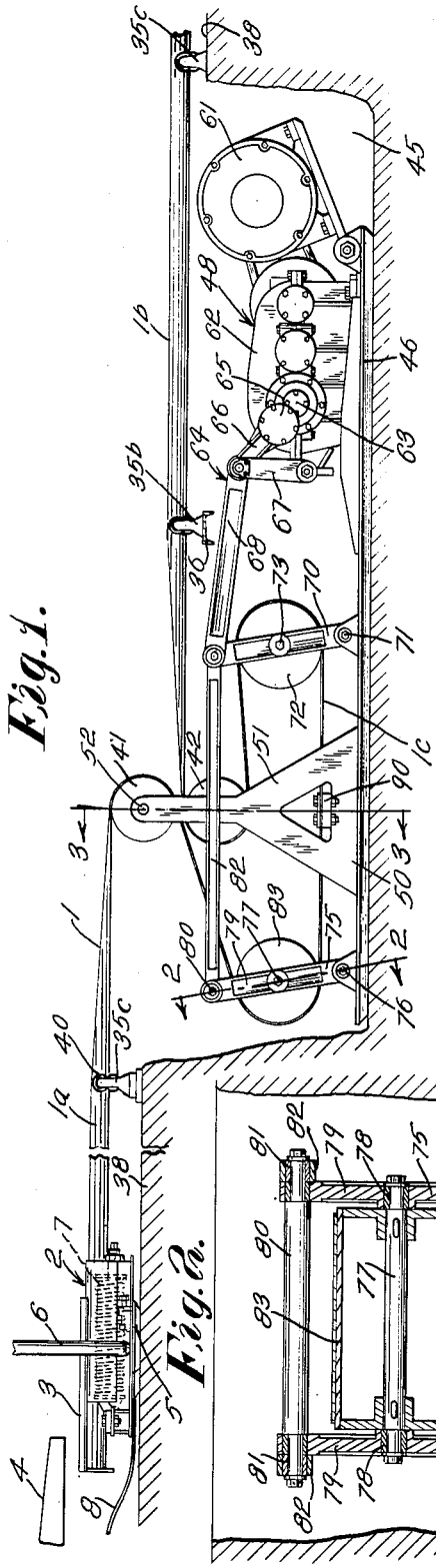
Inventor:
Charles N. Bebinger.
By Louis A. Maxson.
Attorney.

July 10, 1956 C. N. BEBINGER 2,753,985
FLEXIBLE SHAKER CONVEYOR APPARATUS
Filed Dec. 21, 1950 2 Sheets-Sheet 2
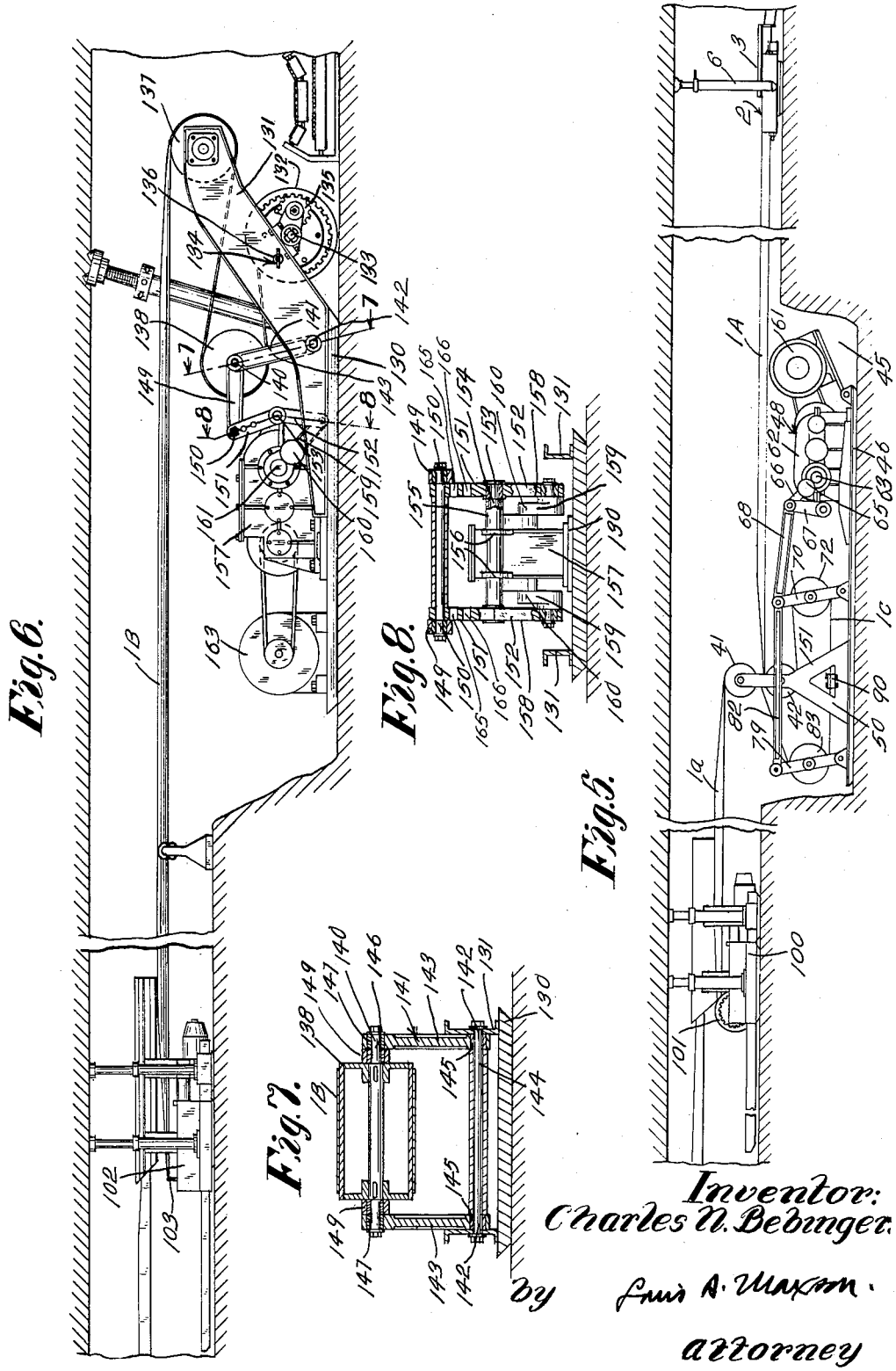
Inventor:
Charles N. Bebinger.
By Louis A. Maxson.
Attorney

2,753,985

FLEXIBLE SHAKER CONVEYOR APPARATUS

Charles N. Bebinger, New Philadelphia, Ohio, assignor to Joy Manufacturing Company, Pittsburgh, Pa., a corporation of Pennsylvania Application December 21, 1950, Serial No. 201,894

6 Claims. (Cl. 198—220)

This invention relates to flexible shaker conveyors. "Flexible shaker conveyors" as here used is intended to designate arrangements for the movement of material by the shaker action of a flexible strip—as, but without limitation thereto, of stainless steel—the strip being of appropriate width to serve as a substitute for a trough line, being appropriately supported and guided for reciprocation so that it does actually serve as a trough line, but being of such flexibility that it cannot be caused to reciprocate except by the exertion of traction alternately at the opposite extremities of strands thereof, this due to the fact that its extreme flexibility would cause it to buckle if subjected to pushes or thrusts having a tendency to cause spaced points therein to approach each other.

Objects of the invention are to provide improved flexible shaker conveyors, of the character mentioned, and, incidentally thereto, to improve certain of the constituent elements thereof. Specific objects of the invention will appear from the ensuing description of it.

In the accompanying drawings, in which three illustrative embodiments of the invention have been shown for purposes of illustration:

Figures 1 and 1A, taken together, show, somewhat diagrammatically, an improved flexible shaker conveyor apparatus constructed in accordance with one illustrative embodiment of the invention.

Figure 2 is an upright transverse section on the plane of the line 2—2 of Figure 1, on a larger scale.

Figure 3 is a vertical transverse section on the plane of the line 3—3 of Figure 1, on a larger scale.

Figure 4 is a fragmentary vertical transverse section on the plane of the line 4—4 of Figure 1A, on a larger scale.

Figure 5 is a view on a smaller scale than Figures 1 and 1A, but showing a somewhat similar embodiment of the invention, the principal difference residing in the fact that the storage reel for the flexible conveyor element is at the material receiving end of the apparatus.

Figure 6 is a somewhat diagrammatic view showing a third illustrative embodiment of the invention.

Figure 7 is an upright transverse section on the plane of the line 7—7 of Figure 6, showing a detail of a drive and motion control apparatus, the view being on a larger scale.

Figure 8 is a transverse section on the planes of the line 8—8 of Figure 6 showing another detail of the drive and motion control apparatus, the view being on a larger scale.

Referring now to the drawings, and first to Figures 1 to 4, it has been pointed out that Figures 1 and 1A together show, somewhat diagrammatically, one embodiment of the improved flexible shaker conveyor. In these Figures it will be noted that a suitable flexible conveyor strip, of, for example, but without limitation thereto, stainless steel of a few hundredths of an inch in thickness, and perhaps 30″ to 42″ wide, and of such flexibility that it cannot be moved by thrusts, but only by pulls, is shown at 1. At its left-hand end it is connected to a tail piece 2, which has a trough portion 3, spring pressed to the left, underlying the delivery conveyor 4 of a "Continuous Miner" and reciprocably supported by a base 5 which is jacked down as by roof jacks 6. The structure of this tail piece is completely illustrated and described in my application for Tail Piece for Flexible Shaker Conveyors, Serial No. 201,893, executed of even date herewith and which I am causing to be filed concurrently with this present case. The end of the strip 1 is fastened to the trough portion 3, and is constantly pulled towards the left in Figure 1 by the spring means 7 as fully explained in said application.

When it is desired to extend the material-receiving end of the strip 1 to the left in Figure 1, the "Continuous Miner" of which the delivery conveyor has a portion illustrated at 4 is adapted to be employed to pull the base 5 to the left, by the cable 8, of which a portion is shown, the jacks 6 having been released, and being again set up when the tail piece 2 occupies the desired new position.

The other end of the strip 1 is, as shown in Figure 1A, connected to a reel 11. The reel has associated with it a discharge trough 12, as illustrated more fully in my application, Driving and Motion Controlling Device for Flexible Shaker Conveyors, Serial No. 201,892, now abandoned. The reel 11 is journaled on brackets or standards 13 mounted on a frame 14, which is slidably supported by base plate 15, which in turn is adapted to be secured in desired positions by means of roof jacks 17. The base plate 15 supports a reaction element 20 against which parallel springs 21, of which but one is shown, press at one end, while their other ends act upon the standards or brackets 13. Hydraulic cylinder and piston means 23 is mounted upon the base plate 15 for moving the reaction element 20 to such a position as to move the reel 11 to take up any slack in the strip 1 and to tension the springs to provide the desired motion of its right-hand end toward the right in Figures 1 and 1A. The hydraulic means 23 includes cylinder and piston mechanism 24 pivotally connected at 25 to the reaction element 20, and at 26 to an abutment structure 27 on the base plate 15. A hand pump and fluid release device 28 of well-known construction is located on the base plate 15 and is operable to pump up pressure in the cylinder and piston mechanism 24 by manipulation of the hand lever 30, and is adapted to build up pressure in the cylinder and piston mechanism 24, to trap it therein, and to release it at will. It will be evident that by the proper control of fluid with respect to the cylinder and piston mechanism 24, the reel 11 may be properly positioned and be caused to exert a proper traction on the end of the strip 1 which is connected to it. The reel 11 may be controlled by a hand crank operable gear train 32, and may be rotated to wind up the strip 1, may be freed to pay off strip, and may be locked against rotation on its axis, as by a locking rod 33. The apparatus at the discharge end of the strip may be located in a depression formed by taking bottom.

Suitable guide devices—for example guide rollers 40—coacting with the lower surface of the strip, and supported in groups on appropriate bases, are adapted to support and trough the flexible strip 1. One such guide device 35a is mounted on the base plate 15, another is shown at 35b on a cross channel 36, and others 35c are shown supported on the mine surface 38.

The strip 1 may be considered as made up of three sections for convenience in further description of this embodiment of the invention. These may be designated 1a, the section between the tail piece 2 and an idler roll 41 shortly to be described; 1b, the section between the reel 11 and an idler roll 42 shortly to be described, and 1c, the section between sections 1a and 1b.

Now, herein shown in a space 45 provided by taking bottom, there is mounted a base 46 of any suitable construction. This supports a drive and motion controlling mechanism generally designated 48 and a vertical frame work 50, which, as shown in Figure 3, consists of upright frames 51 mounted upon the base 46 and providing mountings for cross shafts 52 and 53 upon which the idler rolls 41 and 42 are journaled.

The drive and motion controlling mechanism 48 includes a driving motor 61, a reduction gearing in a gear housing 62 and terminating in a drive shaft 63 for a drive and motion control mechanism proper 64. The shaft 63 carries crank arms 65 actuating links 66 which are pivotally connected to the upper ends of upright, pivoted rockers 67; and these rockers 67 are connected by other links 68 to the upper ends of a rocker frame 70, pivoted at 71 on the base plate 46 and carrying an idler roll 72 for turning on an axis 73 about midway of the height of the rocker frame 70. A parallel rocker frame 75 is pivoted at 76 on the base 46 and carries a cross shaft 77, about midway of its height, in bearings 78 carried by upright arms 79 of the rocker frame 75. The arms 79 are cross connected by a cross bar 80 at their upper ends, and the outer ends of the bar 80 carry pivotal supports 81 for elongated links 82, which extend generally horizontally and are pivotally connected at their other ends to the rocker frame 70. An idler roll 83 is supported by the shaft 77 for rotation on the rocker frame 75. The rocker frames 70 and 75 are generally quite similar, and are parallel to each other, and the principal difference between them resides in the fact that the cross bar of the rocker frame 70 is somewhat more elongated, due to the connection of the links 68 and the links 82 both to it.

The section 1ᶜ of the strip 1 extends from the idler roll 41 and then over the roll 83, and then around the idler roll 72, and then up beneath and over the top of the idler roll 42.

A suitable manually tightenable and releasable clamping device 90 is mounted on the framework 50, and when it is tightened the portions of the strip 1 at its opposite sides operate as if they were entirely distinct. It will be understood that this clamping device must be released each time the strip is pulled from the reel 11 to accommodate advance of the tail piece 2 behind the "Continuous Miner."

The mechanism 64 is effective to provide opposite movements of the idler rolls 72 and 83, towards the left in Figure 1 at a slower speed and towards the right at a higher speed. Accordingly, upon movement of the rolls 72 and 83 to the left section 1ᵃ of the strip is pulled positively to the right at a slower speed, i. e. in a material-discharge direction. Concurrently the springs 21 pull the section 1ᵇ to the right—in a discharge direction, as the leftward movement of the roll 72 makes this possible. Note that material then discharged from the section or run 1ᵃ dumps on section or run 1ᵇ, and run 1ᵇ discharges to the discharge chute 12. On the other movements of the rocker frames, run 1ᵇ is pulled positively, and more rapidly, to the left by the movement of the roll 72 to the right, and the springs 7 of the tail piece 2 pull the run 1ᵃ more rapidly to the left as the movement to the right of the roll 83 makes this possible. As the operation of this embodiment will be clear from what has been so far said this description will not be further protracted, other than perhaps to state that Figure 1 shows the idler rolls 83 and 72 at their leftward extreme position.

In Figure 5 an arrangement very similar to that of Figures 1 to 4 is illustrated. The differences reside in the fact that the tail piece 2 of Figure 1 has been moved and put at the right-hand extremity of the strip 1a, while a walking tail piece 100, carrying a reel 101, and of the construction shown in Figures 1 to 8 of my application for Tail Piece for Flexible Shaker Conveyors, Serial No. 201,893, hereinabove mentioned, is provided at the receiving end of the strip 1a. As a result the strip is elongated by using the self-walking mechanism of the tail piece 100 while paying off strip from the reel 101, and accordingly the clamp 90 need not be released to enable the extension of the overall length of the strip 1a to be increased.

Figures 6, 7 and 8 show another illustrative embodiment of this invention, one in which the idler roll operating in a bight in the conveyor strip is located near one end of the strip, and near the reel on which the portion of the strip not in use for the actual conveying of material is stored.

Referring now to Figure 6, it will be observed that at the material-receiving end of the strip 1B there is arranged a tail piece 102. This combines some of the features of the walking tail piece 100 and of the tail piece 2. The tail piece 102 is essentially a combination of the walking supporting apparatus of Figure 5 and of the first species of my copending application Serial No. 201,893, hereinabove mentioned, and the material-receiving arrangement of the second species of that application. In other words, the reel is removed from the tail piece and a simple attachment device 103 to which the strip 1B is connected is substituted for the reel, but longer material guides like the guides 150, 151 of the first species of Serial No. 201,893, are employed in view of the provision of walking mechanism having a substantial range of extension. At the other end of the strip 1B there is located an arrangement which is herein shown as mounted on a common base 130. This arrangement includes a projecting arm structure or framework 131 rotatably supporting a reel 132, which is provided with means 133 for rotating it and with lock rod means 134 for locking it against rotation, the former means including manually rotatable gearing 135 and the latter a through shaft or bar 136 for locking the reel to the frame, these particular structures being essentially the same as shown in Figure 5 of my application for Driving and Motion Controlling Device for Flexible Shaker Conveyors, Serial No. 201,892, now abandoned.

The framework 131 supports an idler roll 137 at its top, for rotation on a horizontal axis, and the strip 1B passes over this idler roll 137 and then reversely and over another idler roll 138 and then back in its original direction onto the reel 132 to which it is secured. Because of the overhang of the arm structure 131 no discharge chute needs to be built in as a component part of this apparatus.

The idler roll 138 is supported for rotation on a horizontal axis 140, at the upper end of a rocking framework 141, which is pivotally supported at 142 by the base 130. The construction is shown in Figure 7, where it will be noted that upright arms 143 are pivotally mounted on a cross shaft 144 secured in bores 145 in the arm structure or framework 131; and the upper ends of the arms are connected together by a cross shaft 146 which is rotatable in bearings 147 at the tops of the arms and which has the roll 138 keyed to it. Between the ends of the roll 138 and the arms the shaft has pivotally connected to it links 149 which are pivotally connected at 150 to the upper arms 151 of levers 152, which are pivoted at 153 on a shaft 154 (see Figure 8) supported on a sleeve 155 carried by brackets 156 projecting from a gear box 157 also mounted on the base 130. The lower arms 158 of the levers 152 are connected by links 159 to crank arms 160 rotated by a shaft 161 which is rotated by power from a motor 163 and a suitable reduction gearing (not shown) within the gear box 157. As the shaft 161 is rotated unidirectionally and at a uniform speed in a counterclockwise direction from the position shown the idler roll 138 is moved to the right during a relatively much shorter arc of crank arm travel than is traversed by the crank arms 160 during the movement of the idler roll to the left. It will thus be seen that the strip 1B is positively moved in a discharge direction at a relatively slow rate and is drawn by the spring devices associated with the tail piece 102 at a higher speed, limited by the rate of movement permitted by the control of the swing of the levers 152 in the opposite direction. By the proper selection of speeds the material upon the strip will be caused to move with it in the discharge direction, but have the strip slip beneath it in the other direction. As the motion of the drive and control apparatus may desirably be changed to meet different conditions, there is provision for the shifting of the pivotal connections 150 downwards from the position shown in Figure 6, two lower openings 165 and 166 being formed in the upper arms 151 of the levers 152 for this purpose. It will be appreciated that proper speeds and travels of the conveyor strip can be obtained by appropriate selection of driving motor speed, by suitable speed reduction in the reduction gearing, or by appropriate proportioning of lever arms, or by a combination of two or more of these.

It will be evident that with respect to this third species of the invention the whole apparatus, including the tail piece, the strip and the drive and motion control apparatus could be turned end for end, with discharge at the end then occupied by the tail piece (which with any desired elongation and any end flange omitted, would then serve as a discharge device) if the direction of rotation of the drive and control apparatus motor were reversed.

In each of the embodiments described and illustrated improved actuating and control means for a flexible strip conveyor is disclosed, and in Figure 6 a desirable action dependent in no wise on either rectilinear reciprocation or on oscillation of the strip storage reel is provided.

While there are in this application specifically described three forms which the invention may assume in practice, it will be understood that these forms of the same are shown for purposes of illustration and that the invention may be modified and embodied in various other forms without departing from its spirit or the scope of the appended claims.

What I claim as new and desire to secure by Letters Patent is:

1. In combination, a head piece including a yielding mounting, a tail piece including a yielding mounting, one of said piece including a reel mounted on the yielding mounting of said one piece, a frame carrying idler rolls rotating on parallel axes, a single-strand flexible strip conveyor element extending between said pieces and having a portion connected to said reel, said conveyor element passing about said idler rolls and having a bight between its engagements with said rolls, and actuating means for said strip for imparting a traction alternately to the portions thereof at the opposite sides of said idler rolls including a plurality of rolls engaging said conveyor element in said bight and means for reciprocating said rolls concurrently.

2. In combination, a head piece including a yielding mounting, a tail piece including a yielding mounting, one of said pieces including a reel mounted on the yielding mounting of said one piece, a frame carrying idler rolls rotating on parallel axes, a single-strand flexible strip conveyor element extending between said pieces and having a portion connected to said reel, said conveyor element passing about said idler rolls and having a bight between its engagements with said rolls, and actuating means for said strip for imparting a traction alternately to the portions thereof at the opposite sides of said idler rolls including a plurality of rolls engaging said conveyor element in said bight, means for reciprocating said rolls concurrently and a device for holding a point in said conveyor element which lies between said rolls stationary.

3. In combination, a head piece including a yielding mounting, a tail piece including a yielding mounting, one of said pieces including a reel mounted on the mounting of said one piece, a single-strand flexible strip conveyor element extending between said pieces and having a portion connected to said reel, a releasable conveyor element gripping device engaging said element at a point spaced both from said head piece and from said tail piece and intermediate said pieces, a plurality of rolls coacting with said conveyor element between said conveyor element gripping device and one of said pieces, a plurality of rolls coacting with said conveyor element between said conveyor gripping element and the other of said pieces, each of said plurality of rolls including an idler roll having means for supporting the same for rotation on a stationary axis and another roll having means for supporting it for bodily movement, and means for moving said rolls supported for bodily movement concurrently, with a shaker movement.

4. In combination, a head piece including a yielding mounting, a tail piece including a yielding mounting, one of said pieces including a reel mounted on the yielding mounting of said one piece, a frame carrying idler rolls one above the other, a single-strand flexible strip conveyor element extending between said pieces and having a portion connected to said reel, said conveyor element passing about said idler rolls and having a bight between its engagements with said rolls, means including a releasable conveyor element gripping device engaging said element in said bight for holding a portion of it stationary, and actuating means for said strip for imparting traction alternately to the portions thereof at the opposite sides of said idler rolls including a plurality of rolls engaging said conveyor element in said bight and means for moving each of said last mentioned rolls in opposite directions.

5. In combination, a head piece including a yielding mounting, a tail piece including a yielding mounting, one of said pieces including a reel mounted on the yielding mounting of said one piece, a frame carrying idler rolls one above the other, a single-strand flexible strip conveyor element extending between said pieces and having a portion connected to said reel, said conveyor element passing about said idler rolls and having a bight between its engagement with said rolls, means including a releasable conveyor element gripping device engaging said element in said bight for holding a portion of it stationary, and actuating means for said strip for imparting traction alternately to the portions thereof at the opposite sides of said idler rolls including a plurality of rolls engaging said conveyor element at opposite sides of said gripping device in said bight and means for moving each of said last mentioned rolls in opposite directions.

6. In combination, a head piece including a yielding mounting, a tail piece including a yielding mounting, said head piece having a reel mounted on the yielding mounting thereof, a frame carrying idler rolls one above the other, a single-strand flexible strip conveyor element extending between said pieces and having a portion connected to said reel, said conveyor element passing about said idler rolls and having a bight between its engagement with said rolls, means including a releasable conveyor element gripping device engaging said element in said bight for holding a portion of it stationary, and actuating means for said strip for imparting traction alternately to the portions thereof at the opposite sides of said idler rolls including a plurality of rolls engaging said conveyor element in said bight and means for moving each of said last mentioned rolls in opposite directions.

References Cited in the file of this patent

UNITED STATES PATENTS

| | | |
|---|---|---|
| 1,489,167 | Spiess | Apr. 1, 1924 |
| 1,567,550 | Stebbins | Dec. 29, 1925 |
| 1,567,551 | Stebbins | Dec. 29, 1925 |
| 1,593,731 | Stebbins | July 27, 1926 |
| 1,596,465 | Stebbins | Aug. 17, 1926 |
| 1,606,166 | Green | Nov. 9, 1926 |
| 1,941,597 | Cavagnaro | Jan. 2, 1934 |
| 1,954,349 | Dewey | Apr. 10, 1934 |
| 2,114,153 | Sloane | Apr. 12, 1938 |
| 2,280,943 | Ferm | Apr. 28, 1942 |

FOREIGN PATENTS

| | | |
|---|---|---|
| 492,525 | Great Britain | Sept. 19, 1938 |
| 622,674 | Great Britain | May 5, 1949 |